(12) United States Patent
Friedrich et al.

(10) Patent No.: US 11,643,311 B2
(45) Date of Patent: May 9, 2023

(54) PALLET LIFT WITH UNLOADER

(71) Applicant: Cargotec Patenter AB, Kista (SE)

(72) Inventors: Thomas Friedrich, Schliersee (DE);
Terry Fidler, Peachtree City, GA (US)

(73) Assignee: Cargo Patenter AB, Kista (SE)

( * ) Notice: Subject to any disclaimer, the term of this patent is extended or adjusted under 35 U.S.C. 154(b) by 211 days.

(21) Appl. No.: 16/871,476

(22) Filed: May 11, 2020

(65) Prior Publication Data
US 2021/0347618 A1    Nov. 11, 2021

(51) Int. Cl.
| | |
|---|---|
| *B66F 9/19* | (2006.01) |
| *B65G 59/02* | (2006.01) |
| *B65G 59/06* | (2006.01) |
| *B66C 1/22* | (2006.01) |
| *B66C 23/42* | (2006.01) |

(52) U.S. Cl.
CPC .............. *B66F 9/195* (2013.01); *B65G 59/02* (2013.01); *B65G 59/067* (2013.01); *B65G 59/068* (2013.01); *B66C 1/22* (2013.01); *B66C 23/42* (2013.01)

(58) Field of Classification Search
CPC ....... B66F 9/195; B65G 59/02; B65G 59/067; B65G 59/068; B66C 1/22; B66C 23/42; B66C 1/26
USPC ..... 414/795.4, 796.2, 796.5, 796.8; 206/323, 206/324
See application file for complete search history.

(56) References Cited

U.S. PATENT DOCUMENTS

| | | | | |
|---|---|---|---|---|
| 2,659,497 A * | 11/1953 | Verrinder | ............... | B65G 59/08 198/801 |
| 3,543,949 A * | 12/1970 | Weier | ................... | B65G 59/005 221/10 |
| 4,172,686 A * | 10/1979 | Shorthouse | .......... | B65G 59/026 414/796.8 |
| 4,195,959 A * | 4/1980 | Schmitt | .................. | B65G 57/06 414/788.9 |
| 4,405,276 A * | 9/1983 | Wiegand | ............... | B65G 59/026 271/42 |
| 4,781,510 A * | 11/1988 | Smith | .................. | B65G 59/026 414/796.8 |
| 7,874,451 B2 * | 1/2011 | Bel | .......................... | E04D 15/00 220/628 |
| 11,091,330 B2 * | 8/2021 | Yohe | ..................... | B65G 59/026 |
| 2003/0049100 A1 * | 3/2003 | Coblentz | ................... | B66C 1/62 414/803 |

(Continued)

*Primary Examiner* — Lynn E Schwenning
(74) *Attorney, Agent, or Firm* — Renner, Otto, Boisselle & Sklar, LLP

(57) ABSTRACT

A pallet lifter for use with a crane enables lifting of materials on a pallet, and then unloading of the materials at one or more locations, such as on a roof of a building. The pallet lifter may include a cage or a retainer frame that contains the material, with a pusher of the lifter used to push out individual portions of the materials. The pusher may unload the material from the top of the pallet of material, such as by sliding it down a ramp. The pusher alternatively may unload the material from the bottom of the stack on the pallet, by pushing it through a slot in the cage. For top-unloading embodiments the pallet lifter may include an assembly for changing the position of the pusher relative to the frame and the pallet, for example moving the pusher downward layer by later as the materials are unloaded.

23 Claims, 8 Drawing Sheets

(56) References Cited

U.S. PATENT DOCUMENTS

| | | | |
|---|---|---|---|
| 2003/0101854 A1* | 6/2003 | Cucchi | B23B 13/04 |
| | | | 82/127 |
| 2004/0081543 A1* | 4/2004 | Brown | B65G 59/026 |
| | | | 414/796.8 |
| 2013/0000526 A1* | 1/2013 | Mathieson | E04G 3/265 |
| | | | 206/322 |
| 2019/0217989 A1* | 7/2019 | Smith | B65D 19/0018 |

* cited by examiner

US 11,643,311 B2

PALLET LIFT WITH UNLOADER

FIELD OF THE INVENTION

The invention is in the field of pallets lifters for use with cranes.

DESCRIPTION OF THE RELATED ART

Cranes are often used to lift heavy materials, such as construction materials for use in projects on roofs or higher stories of buildings. Such materials are generally lifted on pallets, with the lifting done by a forked pallet lifter at the end of a boom of the crane. The forked pallet lifter includes a fork that engages a pallet that has the materials on it.

Once the construction materials have been lifted on the forked pallet lifter there is a need for the materials to be unloaded from the pallet. The unloading process may be labor intensive and time consuming.

SUMMARY OF THE INVENTION

A pallet lifter for use with a crane includes an unloader for unloading materials from a pallet.

A pallet lifter includes a pusher to push individual portions of material off from a pallet.

A pallet lifter includes a cage to retain materials on a pallet lifter by the lifter. The cage includes a removable front piece that can be put into place after a fork of the lifter engages the pallet. The front piece includes a slot that allows portions of material on the pallet to be pushed out individually.

According to an aspect of the invention, a pallet lifter for use with a crane, the pallet lifter including: a frame; a fork extending from the frame; a material retainer above the fork and mechanically coupled to the frame; and a pusher configured to push materials retained by the retainer from above the fork.

According to an embodiment of any paragraph(s) of this summary, the pusher is configured to push the materials from a top of a material stack on a pallet engaged by the fork.

According to an embodiment of any paragraph(s) of this summary, the pusher includes a push bar that is moved along a spindle under action of a hydraulic motor.

According to an embodiment of any paragraph(s) of this summary, the pusher includes protrusions on a conveyer belt, with the protrusions separated to push individual material portions of the material.

According to an embodiment of any paragraph(s) of this summary, the pusher includes a hydraulic arm that pushes individual material portions of the material off of the pallet.

According to an embodiment of any paragraph(s) of this summary, the pusher is configured to push the materials from a bottom of a material stack on a pallet engaged by the fork.

According to an embodiment of any paragraph(s) of this summary, the material retainer and the pusher are movable together toward and away from the fork.

According to an embodiment of any paragraph(s) of this summary, the material retainer and the pusher are parts of an unloader that are movable together.

According to an embodiment of any paragraph(s) of this summary, the pallet lifter further includes a positioner that moves the unloader relative to the frame.

According to an embodiment of any paragraph(s) of this summary, the positioner includes a hydraulic cylinder that is mechanically coupled to the unloader.

According to an embodiment of any paragraph(s) of this summary, the material retainer is a guide that engages material portions of the material at a top of the material.

According to an embodiment of any paragraph(s) of this summary, the guide has an adjustable width.

According to an embodiment of any paragraph(s) of this summary, the material retainer is a cage.

According to an aspect of the invention, a pallet lifter for use with a crane includes: a frame; a fork extending from the frame; a cage defining a space above the fork; and a pusher configured to push materials out of the cage from the space.

According to an embodiment of any paragraph(s) of this summary, the cage includes a pair of side pieces, and a front piece.

According to an embodiment of any paragraph(s) of this summary, the front piece is selectively separable from the sides.

According to an embodiment of any paragraph(s) of this summary, the front piece has a slot therein.

According to an embodiment of any paragraph(s) of this summary, the slot is at a bottom of the front piece.

According to an embodiment of any paragraph(s) of this summary, the slot is configured for passage of a portion of the materials therethrough.

According to an embodiment of any paragraph(s) of this summary, the slot is configured for the passage of a package of the materials therethrough According to an embodiment of any paragraph(s) of this summary, the side pieces are fixedly attached to the base frame.

According to an embodiment of any paragraph(s) of this summary, the pusher includes a pusher box that is extendable into the space defined by a cage, to push the materials out of the cage.

According to an embodiment of any paragraph(s) of this summary, the pusher includes an actuator that is configured to push the pusher box.

According to an embodiment of any paragraph(s) of this summary, the actuator is a hydraulic cylinder.

According to an embodiment of any paragraph(s) of this summary, the pusher is pivotally coupled to the frame.

According to an embodiment of any paragraph(s) of this summary, the frame includes an upward-extending mast, and an arm extending at a nonzero angle from the mast.

According to an embodiment of any paragraph(s) of this summary, the arm includes a suspension lug for receiving a hook from the crane.

According to an embodiment of any paragraph(s) of this summary, the pallet lifter is in combination with the crane.

According to an embodiment of any paragraph(s) of this summary, the pallet lifter is part of a system that includes the crane, and a control unit of the crane.

According to another aspect of the invention, a method of moving materials that are initially on a pallet, the method including the steps of: supporting the pallet and the materials with a pallet lifter; moving the materials, the pallet, and the pallet lifter using a crane; and unloading distinct portions of the materials, using a pusher of the pallet lifter.

According to an embodiment of any paragraph(s) of this summary, the supporting includes placing the materials in a cage of the pallet lifter.

According to an embodiment of any paragraph(s) of this summary, the unloading includes sequentially pushing the distinct portions through a slot in the cage.

According to an embodiment of any paragraph(s) of this summary, the unloading includes unloading respective of the portions at different locations, the crane used to move the pallet lifter to the different locations prior to unloading the respective of the portions.

According to an embodiment of any paragraph(s) of this summary, the materials include roofing materials, and the distinct portions are individual packages of the roofing materials.

According to an embodiment of any paragraph(s) of this summary, the roofing materials including shingles.

According to an embodiment of any paragraph(s) of this summary, the unloading includes sliding along plastic packaging materials of individual packages of the shingles.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A pallet lifter for use with a crane enables lifting of materials on a pallet, and then unloading of the materials at one or more locations, such as on a roof of a building. The pallet lifter may include a material retainer such as a cage that contains the material, with a pusher of the lifter used to push out individual portions of the materials. The pusher may unload the material from the top of the pallet of material, such as by sliding it down a ramp. The pusher or mover alternatively may unload the material from the bottom of the stack on the pallet, by pushing it through a slot in the cage. For top-unloading embodiments the pallet lifter may include an assembly for changing the position of the pusher relative to the frame and the pallet, for example moving the pusher downward layer by layer as the materials are unloaded.

The pusher may be initially stowed in a parked position, and then pivot into position for use. The pusher may include a hydraulic cylinder that pushes a pusher box to move the portion of the materials relative to the other materials, and the other parts of the pallet lifter. The materials may include roofing materials, for example shingles, and the portions of the materials may be packages of shingles, for instance wrapped with plastic. The pallet lifter may allow the materials to be deposited at various locations, such as various locations along the roof. The pallet lifter may enable faster, more efficient, and/or less labor intensive unloading of materials.

Pallet lifters described herein may be referred to alternatively as auto-unload pallet lifters or simply pallet lifters. These pallet lifters are arranged for use as tools attached to the tip of a crane (e.g. a loader crane mounted to a truck) that enable lifting of materials on a pallet, and then automatically unloading of the materials at one or more locations, such as on a roof of a building.

Figure 1:
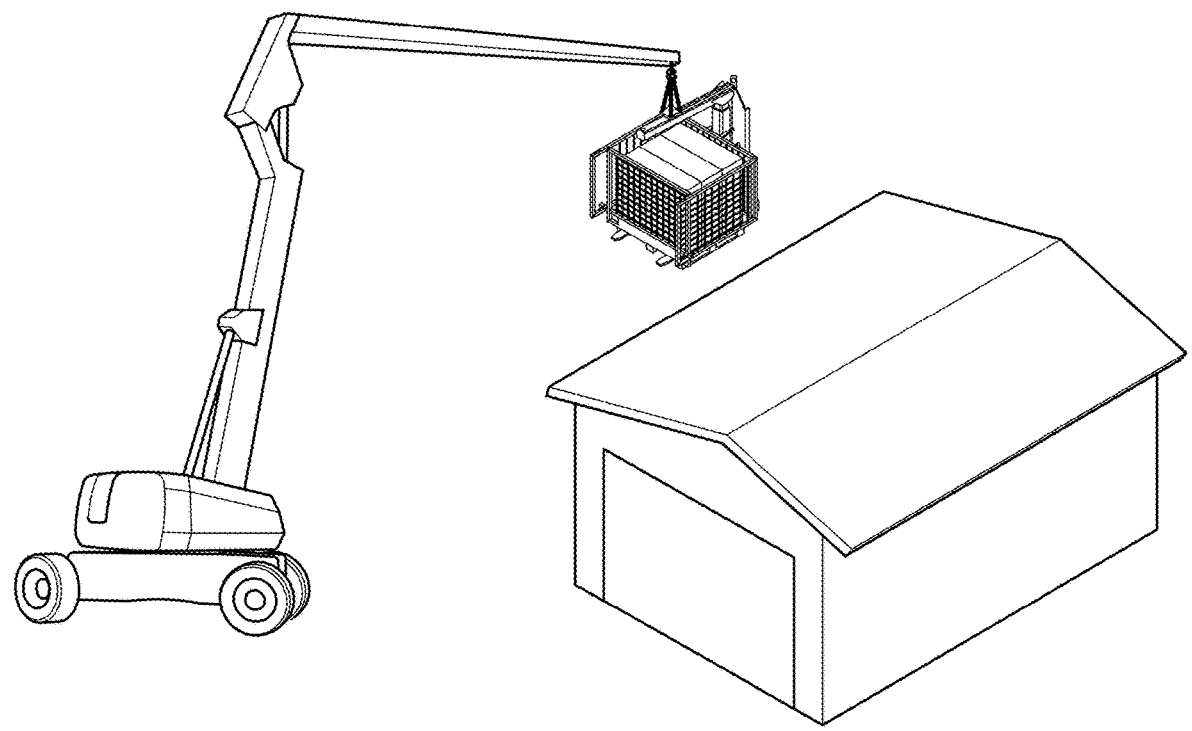
FIG. 1 is a schematic diagram of a system using a pallet lifter in accordance with an embodiment of the invention.

FIG. 1 shows a system 10 that includes a crane 12 that engages a pallet lifter 14 to transport materials 16 to a roof 18 of a structure 20. The crane may be convention, having for instance a base 22 and a series of booms 24 and 26 extending out of the base 22. The booms 24 and 26 may pivot relative to each other and relative to the base 22. The booms 24 and/or 26 may be extendable in length, for instance using boom segments that slide relative to one another to telescope, to thereby change the length of the boom(s). The booms 24 and 26 may also swivel together about the base 22. The movement of the various parts of the crane 12 may be accomplished through conventional means, for example using hydraulic actuation systems remotely controlled by a crane operator, with the crane 12 including a remote control unit used by the operator. The base 22 may be arranged to be mounted to a vehicle such as a truck.

The boom 26 may include a coupling 30 at its distal end for receiving any of a variety of tools. The coupling 30 may include a mechanical connection, as well as other connections, such as connections for providing hydraulic pressure, electrical power, and/or control signals.

Figure 2:
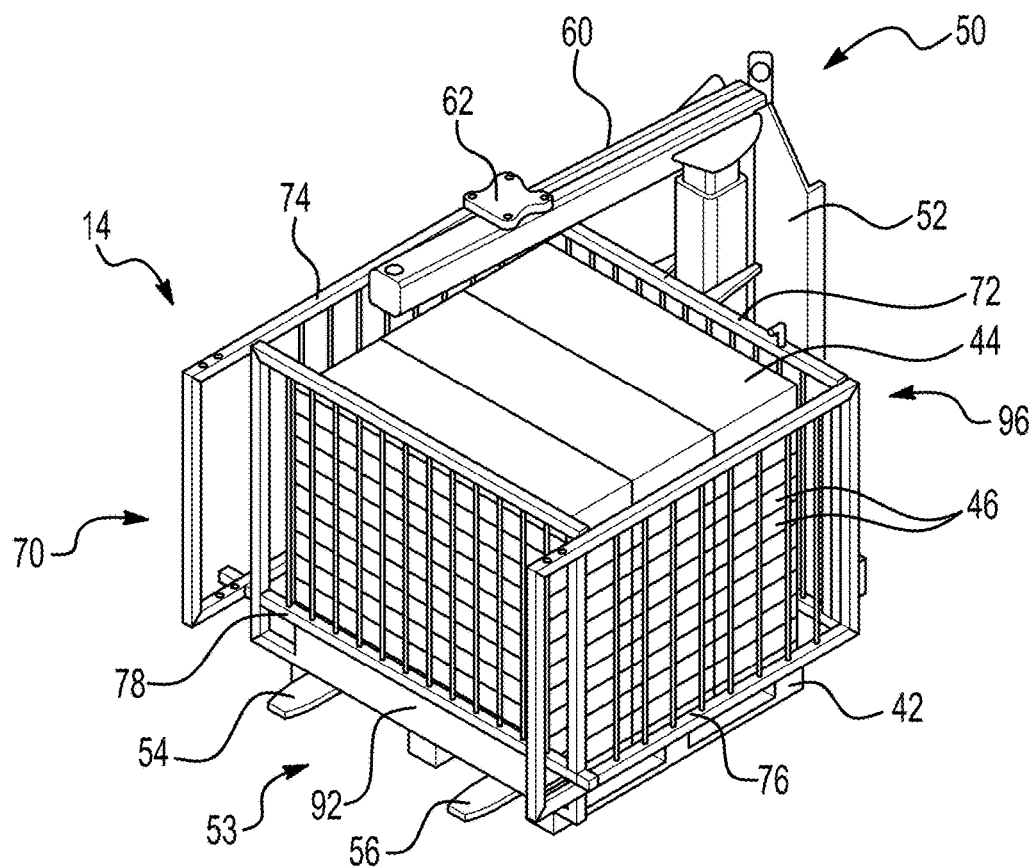
FIG. 2 is an oblique view of the pallet lifter of FIG. 1.

FIG. 2 shows details of the pallet lifter 14 being used to support a pallet 42 that has materials 44 upon it. The materials 44 are able to be separated and unloaded from the pallet 42 in discrete portions 46. In an example the materials 44 may be roofing materials, such as roofing shingles, and the discrete portions 46 may be packages of the shingles. Such packages may be individual wrapped, for example being wrapped in plastic. Having individual packages of the materials 44 wrapped in another material may facilitate sliding of the packages along the pallet 42 and against one another.

The pallet lifter 14 includes a base frame 50 that includes a mast 52, a fork 53 with a pair of fork tines 54 and 56 extending from a cross-bar 58 at the bottom of the mast 52, and an arm 60 angled from an upper end of the mast 52. The fork tines 54 and 56 engage standard openings in the pallet 42 to allow lifting of the pallet 42 and the materials 44 on the pallet 42. The fork 53 may be of conventional configuration.

The arm 60 is used to suspend the pallet lifter 14 from the crane 12 (FIG. 1). A suspension lug 62 on the arm 60 makes connection with the coupling 30 (FIG. 1) on the boom 26 (FIG. 1), to provide mechanical support for the pallet lifter 14, as well as hydraulic pressure, electrical power, and/or control signals, for use by or through the pallet lifter 14.

The pallet lifter 14 includes a cage 70 that surrounds and defines a space 71 that contains the material 44. The cage 70 retains the material on the pallet 42 before and during an unloading process in which the portions 46 are unloaded from the pallet 42 and the lifter 14. The portions 46 may be unloaded individually while other portions of the materials 44 are retained within the cage 70 and atop of the pallet 42.

The cage 70 includes a rear piece 72, a pair of side pieces 74 and 76, and a front piece 78. The pieces 72-78 each may include, to give non-limiting examples, mesh within a frame, such as a series of intersecting vertical and horizontal bars; may be a series of vertical bars within a frame; or may be solid sheets. It is advantageous for the pieces 72-78 to be non-solid, both in terms providing visibility of the materials 44 within the cage 70, and in terms of reducing the weight of the cage 70.

In the illustrated embodiment the rear piece 72 is fixedly attached, either directly or indirectly, to the mast 52 and the cross-bar 58. The side pieces 74 and 76 are fixedly attached to the rear piece 72. For example the side pieces 74 and 76 may each have upper and lower hollow protrusions that fit into and engage upper and lower hollow portions of the frame of the rear piece 72.

The front piece 78 is removable or movable, to allow entry of the materials 44 into the cage 70 as the pallet 42 is engaged by the fork tines 54 and 56. Clips, clamps, or other suitable mechanical fasteners may be used to couple the side parts of the front piece 78 to top and bottom parts of the frame of the side pieces 74 and 76. The front piece 78 may be configured to be separated entirely from other parts of the cage 70, or alternatively may be configured otherwise, for example being allowed to pivot upward to allow entry of the materials 44 into the volume defined by the cage 70.

The front piece includes a slot 92 at its lower end. The slot 92 is configured to allow passage therethrough individual of the materials portions 46, when pushed by a pusher 96 of the pallet lifter 14. The slot 92 may have a size suitable for passage of a desired amount of the materials 44, for example a package of roof shingles.

Figure 3:
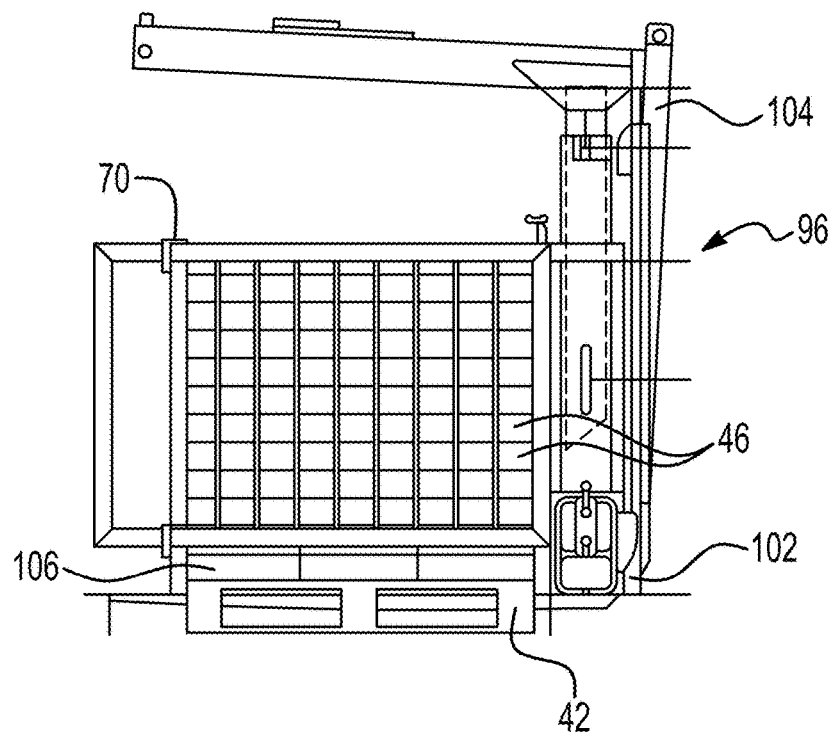
FIG. 3 is a side view of the pallet lifter, with a pusher in a stowed (or parked) position.
Figure 4:
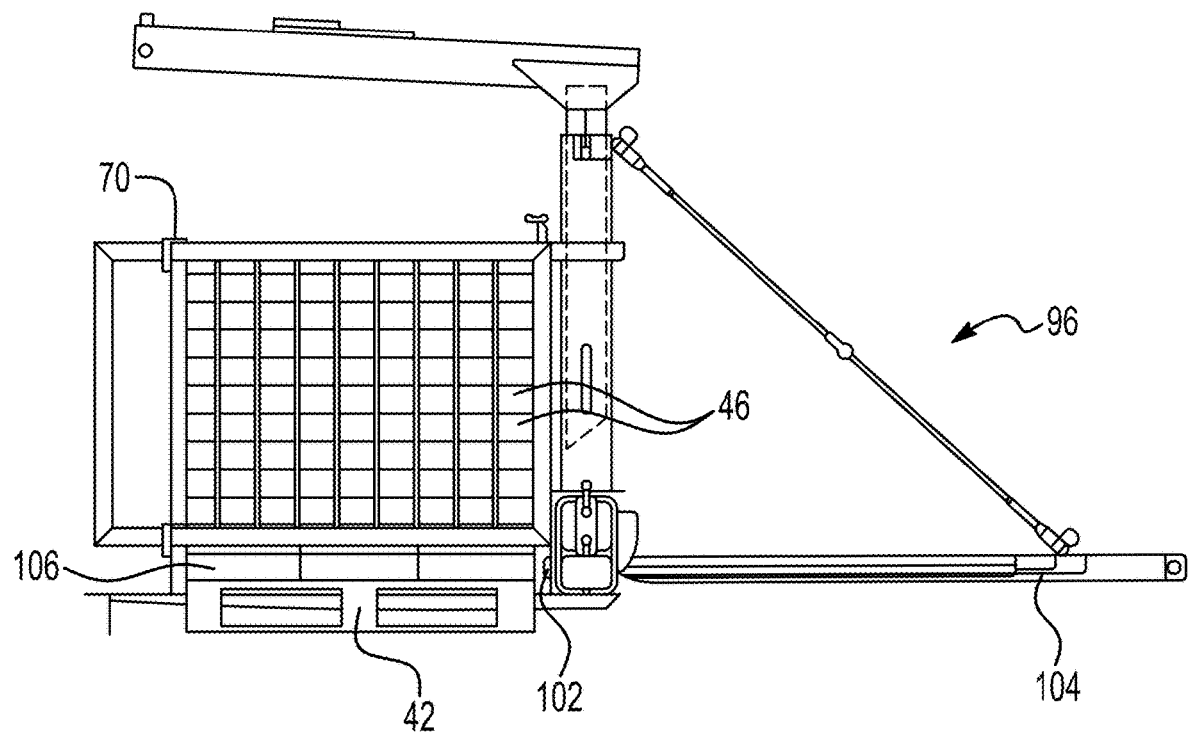
FIG. 4 is a side view of the pallet lifter with the pusher in a deployed position.

The pusher 96 is able to move between a parked position, shown in FIG. 3, where it is up against the mast 52, and deployed position, shown in FIG. 4, where the pusher 96 is configured to unload the materials portions 46 by pushing the materials portions 46 out of the cage 70. The pusher 96 pivots to be moved between the parked position and the deployed position, as described further below.

The pusher 96 includes a pusher box 102 and an actuator 104. The pusher box 102 makes content with the bottommost materials portion 106, and is used to expel the materials portions 46 from the cage 70 one at a time. The pusher box 102 is shown in the illustrated embodiment as rectangular, but it will be appreciated that the pusher box 102 may have any of a wide variety of other shapes suitable for engaging and pushing the materials portions 46. The actuator 104, which may be a hydraulic cylinder, is used to provide the motive force for moving the pusher box 102 and the materials portion 46. The actuator 104 may be operatively coupled to the crane 12 (FIG. 1) to provide hydraulic power from the crane 12 to the hydraulic cylinder. It will be appreciated that the actuator 104 alternatively may involve other types of actuators, for example using an electric motor or motors.

Figure 5:
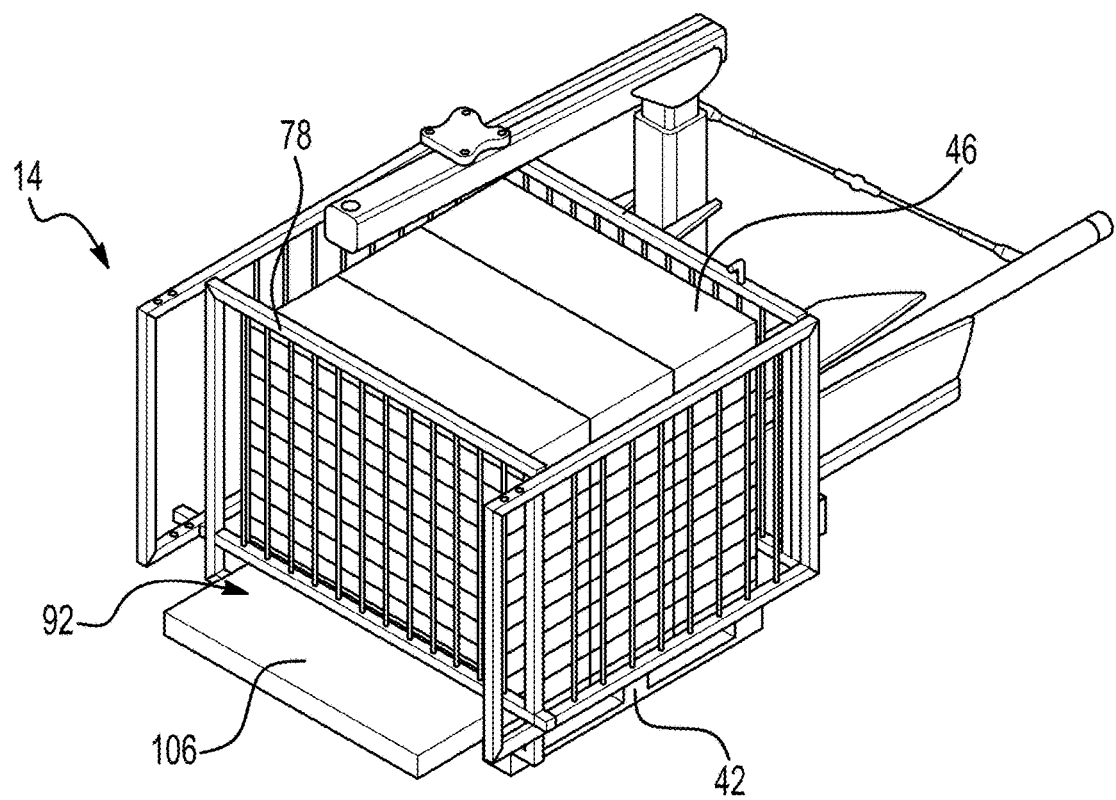
FIG. 5 is an oblique view of the pallet lifter, in the midst of a process of unloading a materials portion.
Figure 6:
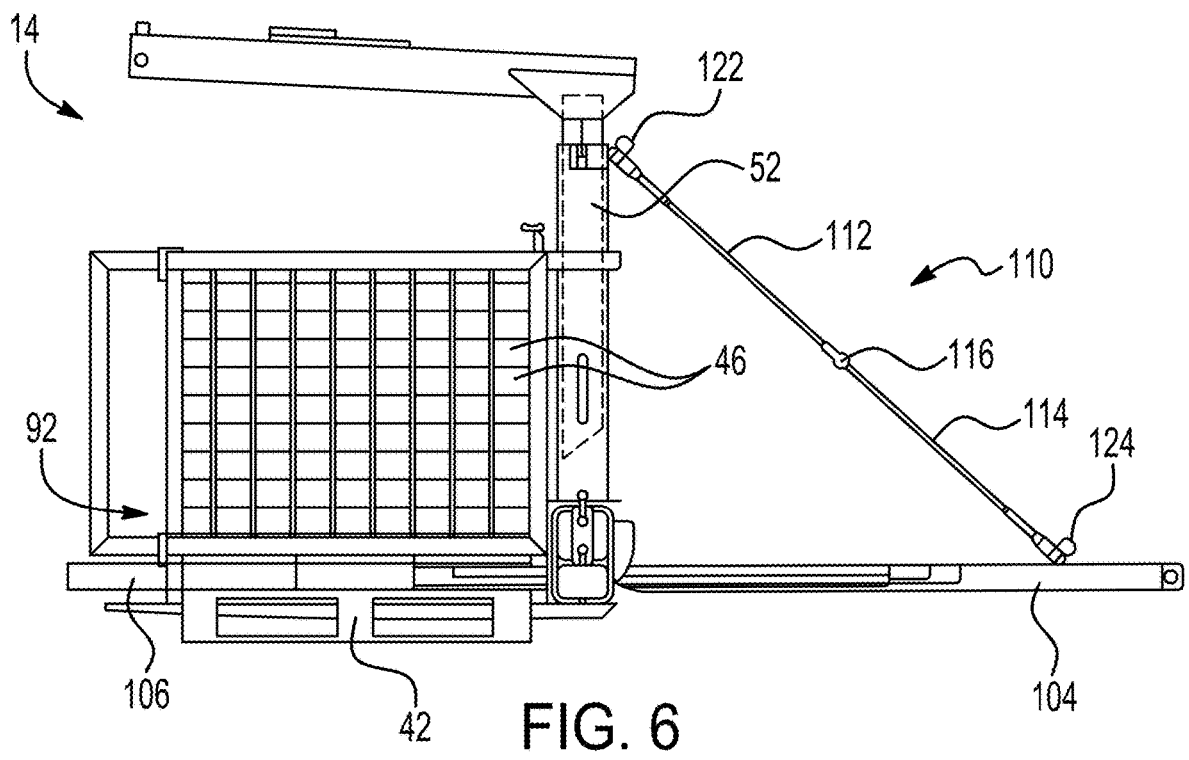
FIG. 6 is a side view of the pallet lifter of FIG. 5.

FIGS. 5 and 6 show an intermediate step in the process, with a bottommost materials portion 106 emerging from the slot 92. At this point the actuator 104 has been extended partially to slide the bottommost materials portion (layer) 106 relative to both the pallet 42 and the other materials portions (layers) 46. The materials portion 106 being pushed may be coated by a material that provides a low enough level of friction to enable or facilitate the sliding relative to the pallet and the other materials portions. For example the materials portions 46 may be individually wrapped in plastic, such as packages of shingles wrapped in plastic.

While the bottommost materials portion 106 is pushed by the pusher box 102 the other materials portions are maintained within the cage 70 by being held in place by the cage's front piece 78. Initially it would be expected that all of the materials portions 46 slide relative to the pallet 42 until the front piece 78 is reached. Then the bottommost materials portion 106 passes through the slot 92 while the other materials portions 106 are maintained in place by the front piece 78.

The process of unloading the bottommost materials portion 106 (disengaging the bottommost materials portion 106 from the pallet lifter 14) may be repeated over and over, with the pusher box 102 retracted by retracting the actuator 104 between disengagement steps. Once the pusher box 102 is sufficiently retracted, the remaining materials portions 46 drop down, aligning another of the materials portions 46 with the front piece slot 92. This puts the pallet lifter 14 in position to unload another materials portion 46 by using the pusher 96 to push the new bottommost materials portion through the slot 92 and out of engagement with the pallet lifter 14.

Figure 7:
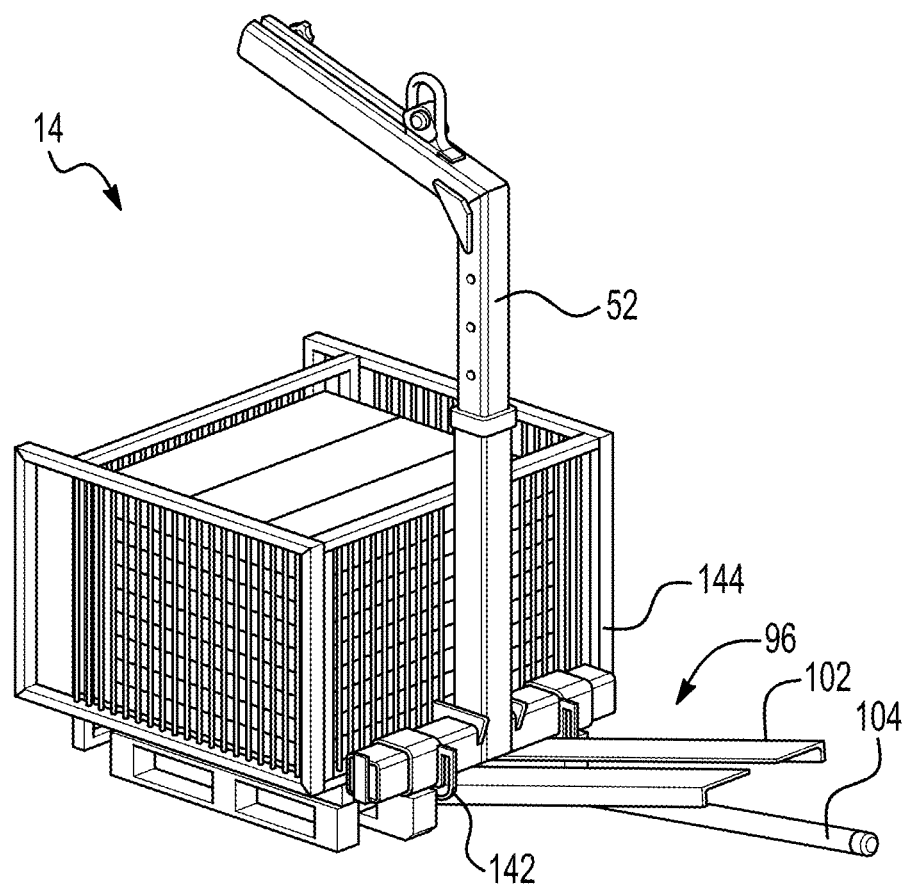
FIG. 7 is an oblique view of the pallet lifter, with the pusher partially deployed.
Figure 8:
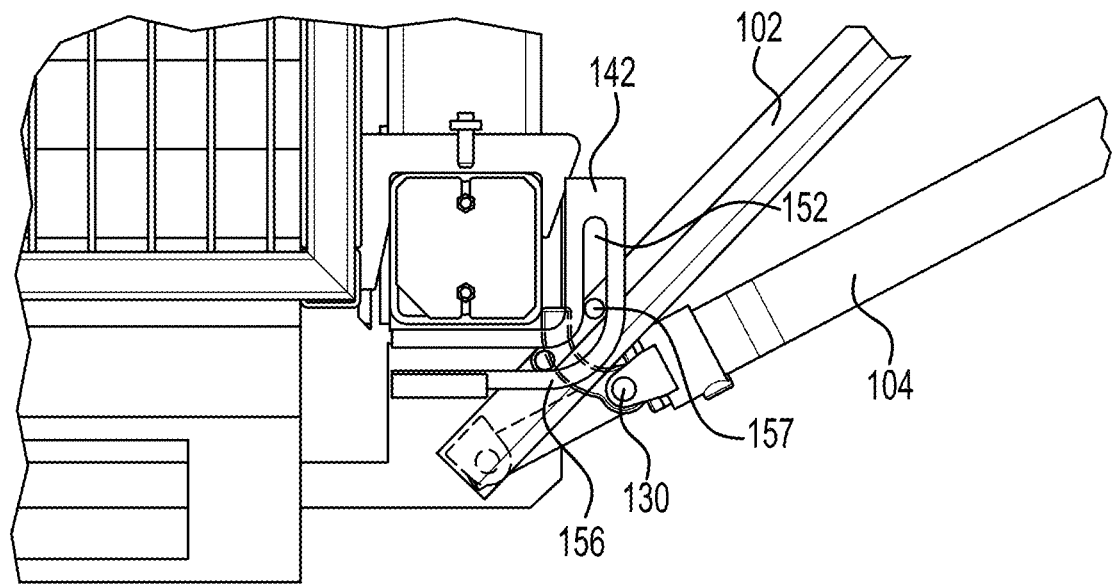
FIG. 8 is a side view of part of the pallet lifter of FIG. 7.
Figure 9:
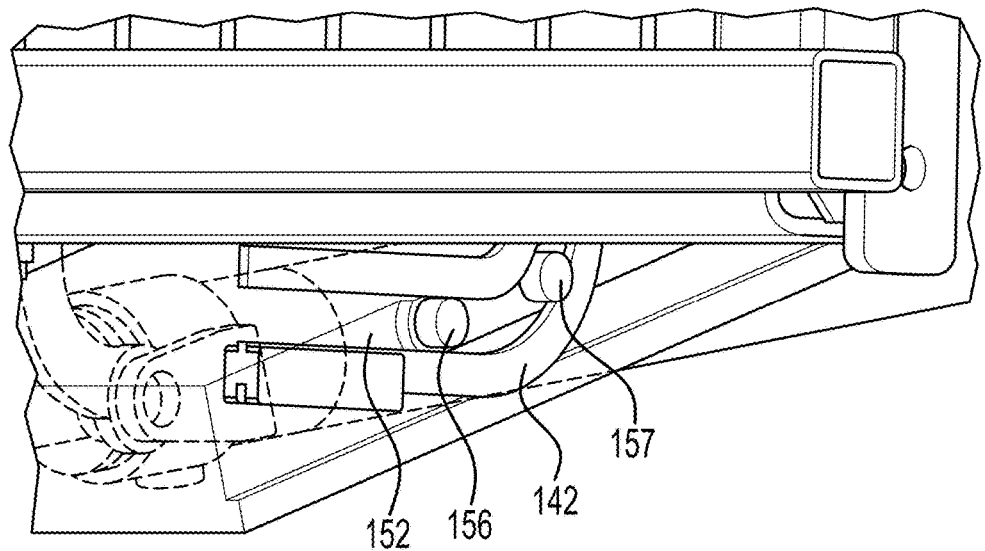
FIG. 9 is an oblique view of part of the pallet lifter of FIG. 7.

With reference now in addition to FIGS. 7-9, the process is illustrated of moving the pusher 96 between the parked (or stowed) position, and the deployed position. The actuator 104 is mechanically coupled to the mast 52 by a hinged rod 110, shown in FIG. 6, which is composed of two rod parts 112 and 114 that can pivot at a pivot coupling 116 between them. The rod part 112 is connected to the mast 52, and the rod part 114 is connected to the actuator 104. When the pusher 96 is in the parked position the rod parts 112 and 114 are folded up onto each other, with the rod parts 112 and 114 roughly parallel to one another. In this configuration respective eyes 122 and 124 on the rod parts 112 and 114 align, and may be able to receive a suitable locking pin (not shown) for holding the pusher 96 in the parked position.

Once the hinged rod 110 is unlocked the pusher 96 may be moved to the deployed position, in which the pusher 96 may be used to move the materials portions 46. As the hinged rod 110 is unfolded, the actuator 104 pivots about a pivot point 130, from the vertical parked position to a horizontal deployed position where the actuator 104 is in line with bottommost materials portion 46 on the pallet 42. The maximum length of the hinged rod 110 may be set by adjusting the lengths of the rod parts 112 and/or 114, so as to put the actuator 104 in the desired orientation when in the deployed position.

The pusher box 102 also changes orientation in the movement from its vertical orientation in the parked position, to a horizontal orientation in the vertical position. The pallet lifter 14 includes a pair of guide blocks 142 and 144 attached to the base frame 50, on opposite sides of the mast 52. The guide blocks 142 and 144 have guide tracks, such as a track 152, that are engaged by pairs of cam protrusions on opposite sides of the pusher box 102, such as cam protrusions 156 and 157. As the pusher 96 deploys, the cam protrusions 156 and 157 on each side of the pusher box 102 follow the guide tracks, such as the guide track 152, to turn the pusher box 102 in a controlled manner, from a vertical orientation to a horizontal orientation.

Figure 10:
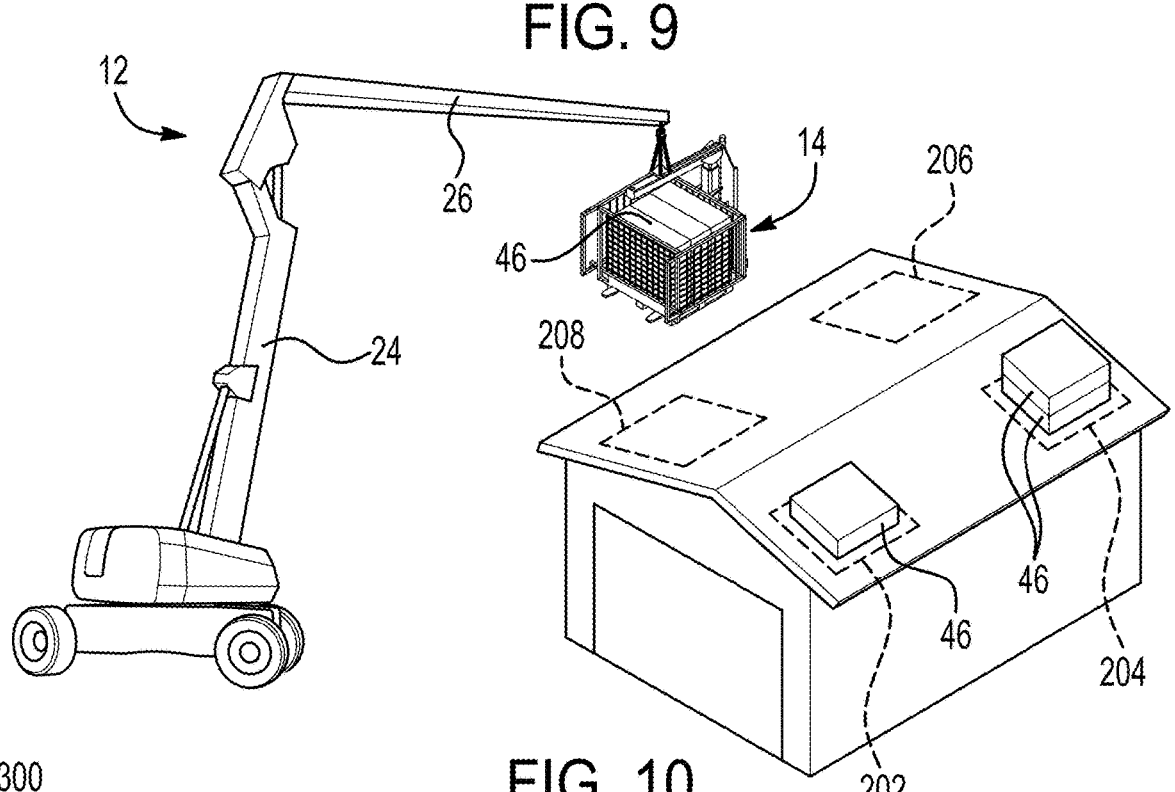
FIG. 10 is an oblique view illustrating unloading of materials using the system of FIG. 1.

FIG. 10 illustrates a process of unloading the portions 46 of the materials 44 at various locations on a roof 200. In the example one of the portions 46 has been deposited in a location 202, two of the portions 46 have been deposited at a location 204, and the pallet lifter 14 is on its way to deposit further of the materials portions 46 at locations 206 and 208. By depositing portions of the materials at the different locations 202-208 using the pallet lifter 14 the effort of getting the materials where they are ultimately used may be reduced. Instead of manually moving the unloaded materials from a single location on the roof, they may be spread out into multiple locations, reducing the need to further move the materials, both in terms of amount of material to be moved and the distance the materials are to be moved.

Figure 11:
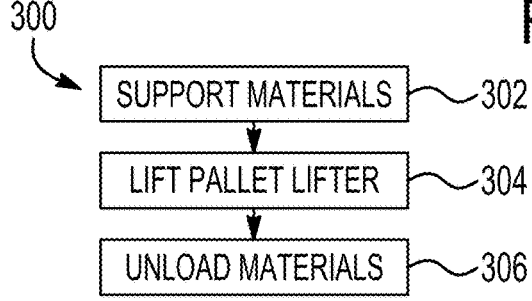
FIG. 11 is a high-level flow chart of a method according to an embodiment of the invention.

FIG. 11 shows a high-level flow chart of a method 300 of using the pallet lifter 14 (FIG. 1) to unload the materials portions 46 (FIG. 2). In step 302 the materials 44 (FIG. 2) on the pallet 42 (FIG. 2) are supported using the pallet lifter 14 (FIG. 1). This may involve the engagement of the pallet 42 with the fork 53 (FIG. 2), and closure of the materials within the cage 70 (FIG. 2) by putting the front piece 78 (FIG. 2) into place to complete the enclosure of the cage 70.

In step 304 the pallet lifter 14 (FIG. 1) is lifted using the crane 12 (FIG. 1), and is moved into place where the unloading of the materials 44 (FIG. 2) is desired. Finally distinct portions of the materials 44, such as the materials portions 46 (FIG. 2) are unloaded in step 306. This is done using the pusher 96 (FIG. 2), as described above. The pusher 96 may be moved from the parked to the deployed position prior to the unloading of the materials portions 46. As described above, different of the materials portions 46 may be unloaded at different locations, such as different locations on a roof or elsewhere on a building.

The method 300 has been described in the previous paragraphs with regard to the pallet lifter 14 (FIG. 1). However it will be appreciated that the method 300 may also be performed using the other pallet lifter embodiments described herein.

The pallet lifter and methods described above provide many benefits over previous approaches. The effort, labor, and time for unloading the materials is greatly reduced. This may lead to reduced construction costs for projects such as roofing or re-roofing a building. In addition the pallet lifter may be use to distribute the materials at different locations along a roof and/or other parts of a building, reducing the amount of movement of materials necessary after they have been unloaded. The pallet lifter further may be monitored with a camera system or other type of imaging sensors. The unloading may be remotely controlled by using a remote control unit, such as for maneuvering the crane. The pallet lifter may hence also include a mount for attaching a camera or sensor unit for monitoring the automatic unloading.

This also may reduce labor involved in a project. Further, the cage of the pallet lifter helps retain the materials on the pallet during movement and unloading.

What follows now are some additional embodiments of pallet lifters, having some additional features and modes of operation. Some of the features of the various embodiments described herein may be combined together in new embodiments.

Figure 12:
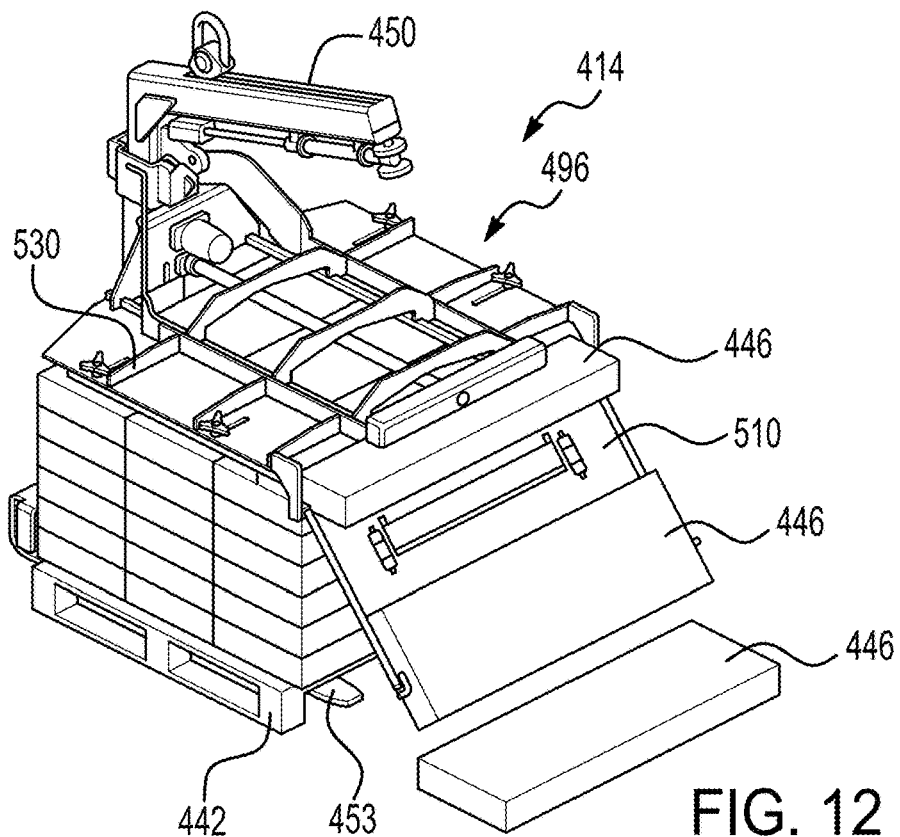
FIG. 12 is an oblique view of a pallet lifter according to another embodiment of the invention.
Figure 13:
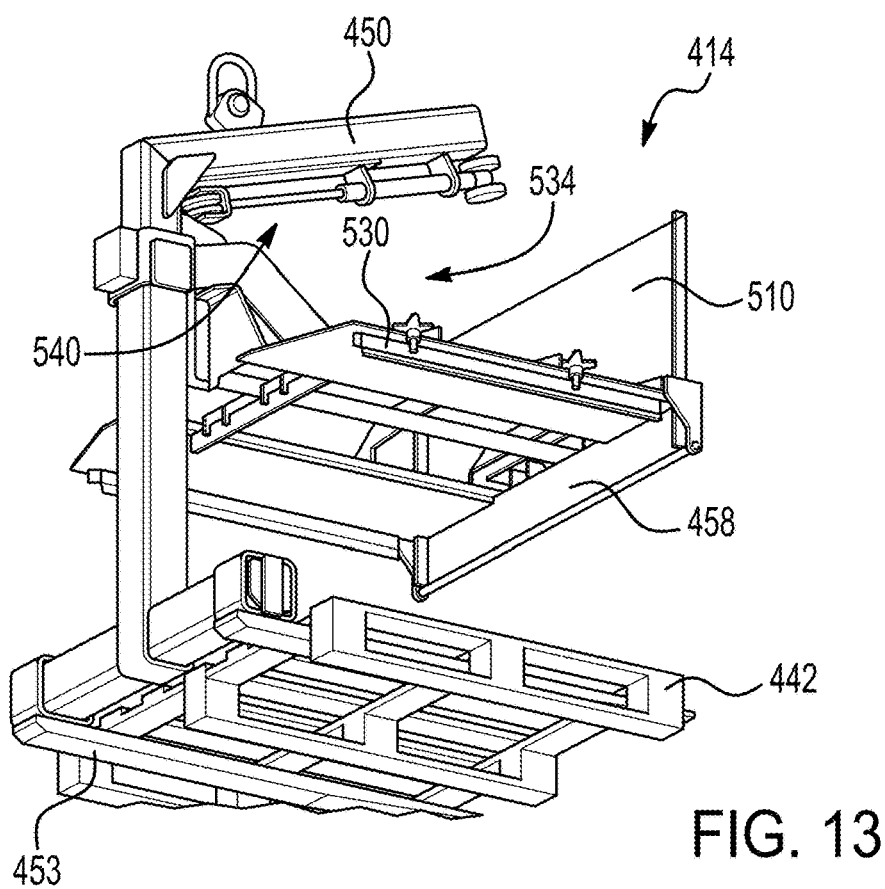
FIG. 13 is another oblique view of the pallet lifter of FIG. 12.

FIGS. 12 and 13 show a pallet lifter 414 that is adapted to be used with a crane, such as the crane 12 (FIG. 1). The pallet lifter 414 includes a frame 450; a fork 453 extending from the frame; a material retainer such as a retainer frame or retainer 458 for securing at least one part of material, such as one of a series of material portions 446, arranged on a pallet 442 during unloading; and a pusher 496, also referred to as a movable means, for pushing at least another part of the material arranged on the pallet off the pallet during unloading (see FIG. 1). The pallet lifter 414 may be implemented in different embodiments, with FIGS. 12 and 13 showing a non-limiting one of these embodiments.

The pusher (also referred to as movable means) 496 for pushing at least one part of the material (one of the material portions 446 off the pallet 442 during unloading may be hydraulically actuated and connected to the hydraulic system of the crane. The pallet lifter 414 and its movable means 496 may be remotely controlled, such as from the maneuvering unit of the crane to which it is mounted. The pallet lifter 414 further may be monitored with a camera system or other type of imaging sensors. The pallet lifter 414 may hence also include a mount for attaching a camera or sensor unit for monitoring the automatic unloading.

The materials loaded and unloaded to/from the pallet may include roofing materials, for example shingles. The material may be packaged in portions 446, such as packages of shingles, for instance wrapped with plastic. Using the pallet lifter 414 mounted to a crane the materials may be deposited at various locations, such as various locations along the roof. The pallet lifter 414 may enable safer, faster, more efficient, and/or less labor intensive unloading of materials.

The pallet lifter 414 includes the retainer frame 458, which secures at least a first part of the material portions 446 while the movable means (or pusher) 496 of the lifter 414 is used to push out other individual material portions 446 from the pallet 442. Optionally, the pallet lifter 414 may further be equipped with a slide or ramp 510 to guide the material packages 446 that are pushed out from the pallet 442 by the moveable means 496. The slide 510 may be hingedly connected to the retainer frame 458, able to pivot out and down into a sloped ramp configuration.

Figure 14:
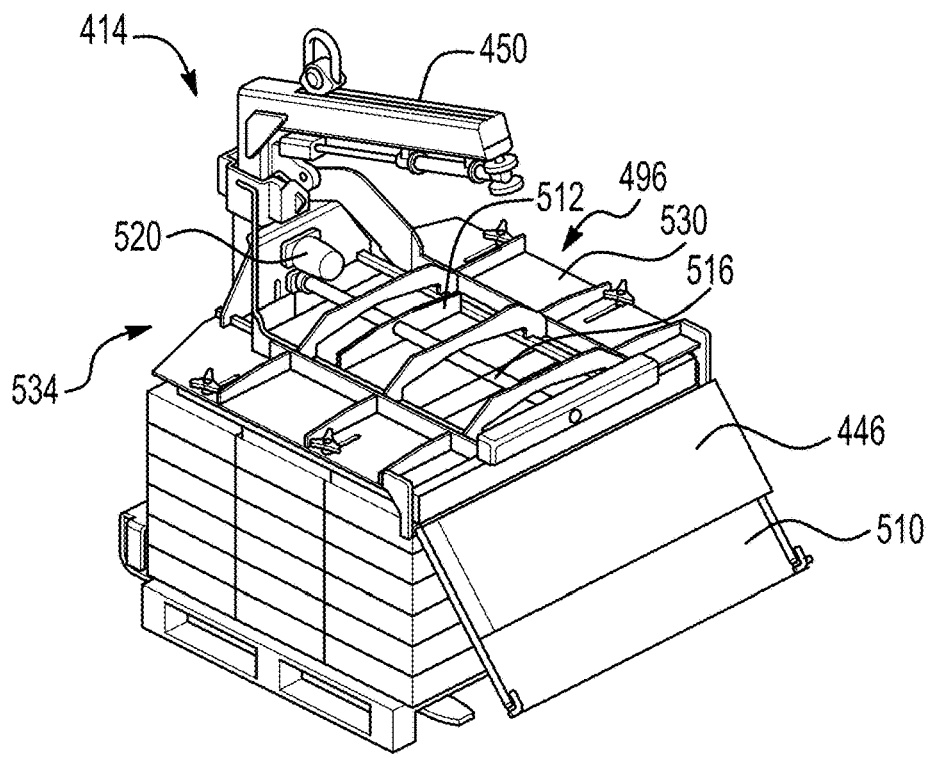
FIG. 14 is yet another oblique view of the pallet lifter of FIG. 12.

With reference now in addition to FIG. 14, the movable means 496 includes a drawer or push bar 512 on a spindle 516. A hydraulic motor 520 actuates the movement of the spindle 516 using a worm gear arrangement. This rotation of the spindle effects movement of the drawer or push bar 512. The hydraulic motor 520 may be operatively coupled to the hydraulic system of the crane. An adjustable guide 530 is used for aligning the material. The guide 530 keeps the material portions 446 in alignment with the push bar 512 and the spindle 516, which together with the hydraulic motor 520 and the retainer 458 (and other parts of the lifter 414) constitute an unloading arrangement (or unloader) 534. The guide serves to keep the material portions 446 in proper position as the material portions 446 are guided off the pallet 442 during unloading. The width of the guide 530 may be adjustable by screws at the side, to fit the width of the material portions 446 on the pallet 442.

The drawer 512 pushes a layer of the material at a time out from the top of the pallet 442 as the drawer (or push bar) 512 moves from a position close to the frame 450 to the opposite side of the pallet 442, away from the frame 450. The retainer 458 secures the layers of the material that lie below the layer that is being unloaded. As an option the slide 510 may be attached to the pallet lifter 414 to guide the material from the pallet 442 and to a position next to the pallet lifter 414. The retainer frame 458, the guide 530, the drawer or push bar 512, the spindle 516, the hydraulic motor 520, and the slide 510 together constitute the unloading arrangement (or unloader) 534. The unloader 534 is arranged to be moved along the frame 450, for example as the height of the material on the pallet 442 changes.

Figure 15:
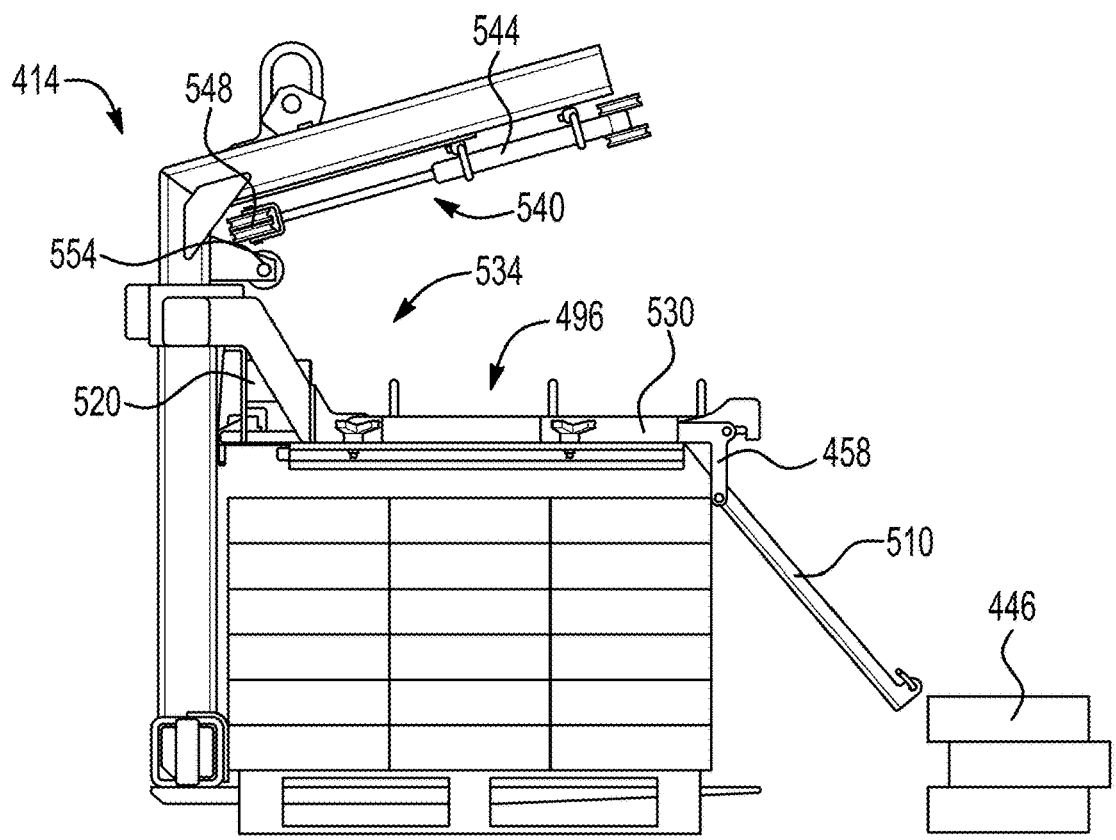
FIG. 15 is a side view of the pallet lifter of FIG. 12.

As the material is unloaded from the pallet 442 the unloader 534 may be moved down relative to the frame 450, as the material portions 446 are unloaded layer by layer. The position of the unloading arrangement 534 along the frame 450 is thus adapted to the layer of material to be unloaded from the pallet 442. Once one layer (at the top) is completely unloaded the unloader 534 is shifted downward to enable another layer to be reached by the drawer 512. With reference to FIG. 15, the pallet lifter 414 includes an assembly 540 for controlling the position of the unloading arrangement 534 along the frame 450, with this assembly also referred to herein as a positioner.

The assembly 540 for controlling the position of the unloading arrangement 534 along the frame 450 of the pallet lifter 414 may include a hydraulic cylinder 544 and a pulley 548. A cable or wire rope may extend between the pulley 548 and a corresponding pulley 554 on the unloader 534. A piston of the cylinder 544 may be extended or retracted for securing and controlling a position of the unloader 534.

The control of the position of the unloading arrangement 534 may further depend on the position of the drawer (push bar) 512 on the spindle 516, so that the drawer 512 when returning to the start position at the side of the pallet 442 nearest to the frame 450 may trigger downward movement of the unloading arrangement 534. As an example, the drawer 512 may when returned to the start position trigger the pressure in the hydraulic system of the pallet lifter 414 to rise and thereby activate a switch valve that automatically lowers the unloading arrangement 534 to be able to reach the next layer of the material portions 446. When the unloading arrangement 534 reaches the appropriate level for the next layer of material to be unloaded, the position of the unloading arrangement 534 may be locked to fix the position of the unloading arrangement 534.

The unloading arrangement 534 will be at the bottom of the pallet 442 when all the material layers have been unloaded. The operator may further manually activate a switching valve to enable the unloading arrangement 534 to be lifted again, in order to receive a new pallet with material to be unloaded. By manually reactivating the switching valve after loading the new pallet the position of the unloading arrangement 534 will again be made dependent on the position of the drawer 512.

Figure 16:
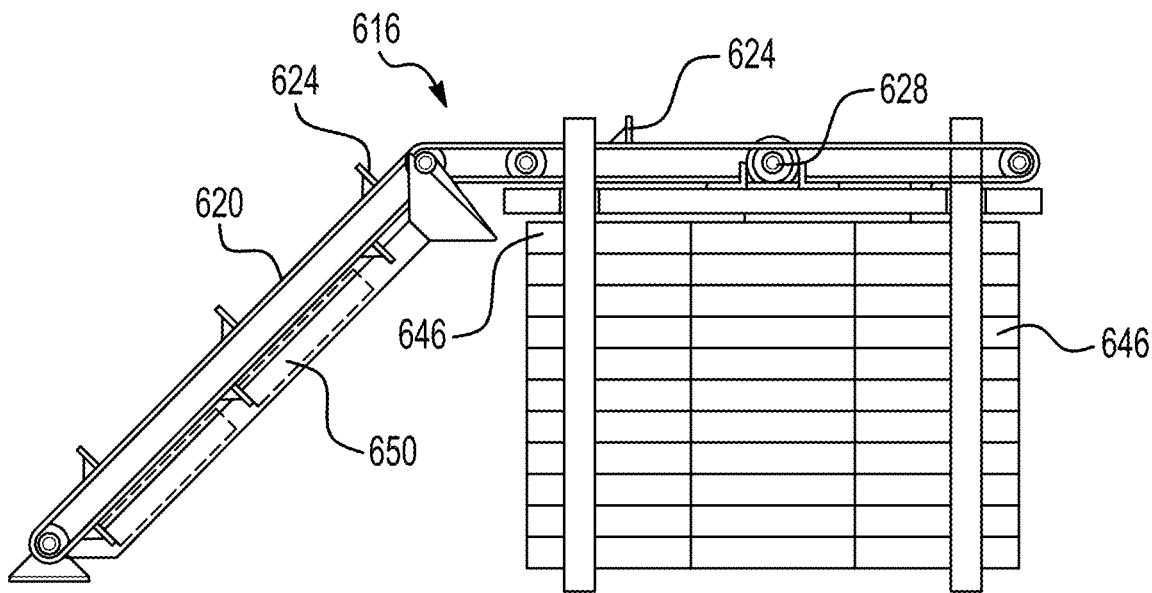
FIG. 16 is a side view of a portion of a pallet lifter according to a further embodiment of the invention.

FIG. 16 illustrates an alternative movable means (or material mover) 616 for use as an alternative embodiment of the pusher 496 (FIG. 12). The mover 616 includes a conveyor belt 620 the includes pushing elements 624, protrusions extending outward along the belt 620, to push the material to be unloaded from the pallet 442 (FIG. 12) in response of the movement of the conveyor belt 620. The belt 620 recirculates along a series of rollers 628, at least one of which may be actively driven (turned) to move the belt 620. The protruding pushing elements 624 may be spaced apart on the belt 620 by a spacing corresponding to dimensions of material portions 646. The conveyor belt 620 may be mounted to an unloading arrangement similar to the unloading arrangement 534 (FIG. 14), with a retainer frame and a guide. The conveyor belt 620 may optionally be arranged to also cover a slide or chute 650 enabling a secure unloading of the material, for example functioning similarly to the slide or ramp 510 (FIG. 11).

Figure 17:
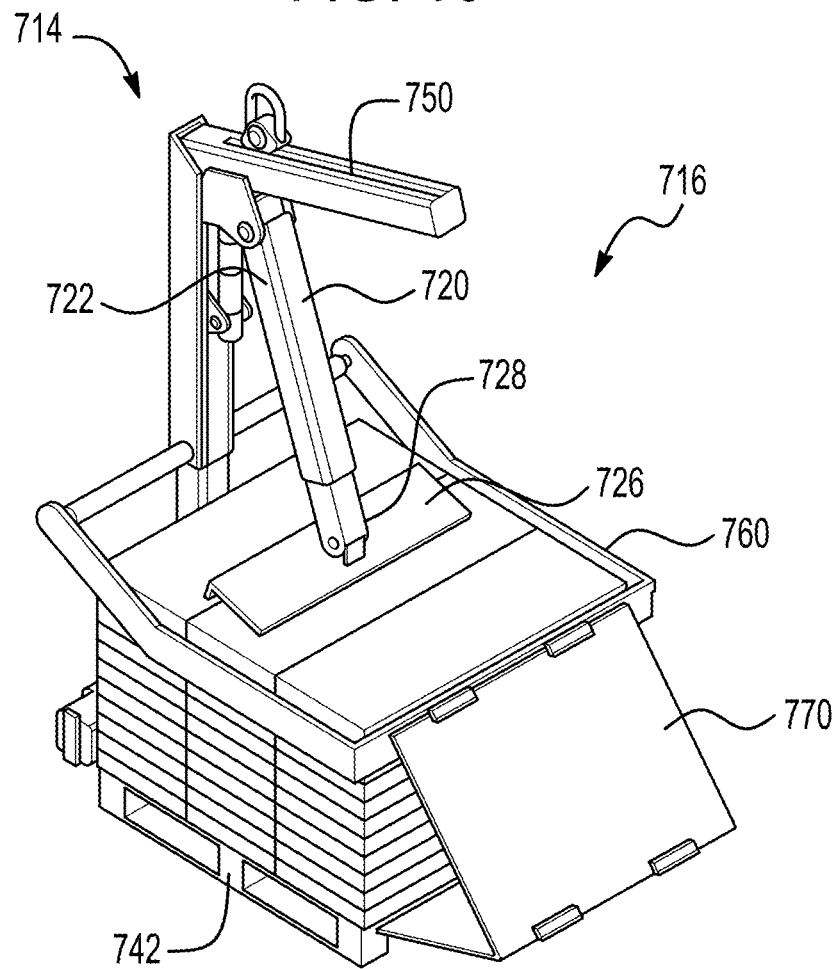
FIG. 17 is an oblique view of a pallet lifter according to a still further embodiment of the invention.

FIG. 17 shows another alternative of a pusher, a moveable means 716 that includes a hydraulically-actuated pusher arm 720. In such an embodiment a first end 722 of the pusher arm 720 may be pivotally attached to the top part of a frame 750 of a pallet lifter 714. A pushing plate 726 may be pivotally arranged at a second end 728 of the pusher arm 720, to be able to push out material, such as material portions 746, from a pallet 742, layer by layer, in response to the extension and retraction of a hydraulic cylinder in the pusher arm 720. The pallet lifter 714 further may include another example of a material retainer, in the form or configuration of an enclosing structure 760 movably attached to the frame 750, for example able to be moved downward by a suitable hydraulic actuation system, which may be combined with suitable mechanical components such as pulleys and cables. The pusher arm 720 may be arranged to unload the material from the pallet 742 starting from the top, as depicted in FIG. 17. The pallet lifter 714 may include a slide or ramp 770 that the material portions 746 slide down, one at a time.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A pallet lifter for use with a crane, the pallet lifter comprising:
   a frame;
   a fork extending from the frame;
   a material retainer above the fork and mechanically coupled to the frame; and
   a pusher configured to push materials retained by the retainer from above the fork;
   wherein the frame includes
   a suspension lug capable of coupling to the crane;
   an upward-extending mast; and
   an arm extending at a nonzero angle from the frame;
   wherein the suspension lug is on the arm of the frame; and
   wherein the pusher is mechanically connected to the mast.

2. The pallet lifter of claim 1, wherein the pusher is configured to push the materials from a top of a material stack on a pallet engaged by the fork.

3. The pallet lifter of claim 2, wherein the pusher includes a push bar that is moved along a spindle under action of a hydraulic motor.

4. The pallet lifter of claim 2, wherein the pusher includes protrusions on a conveyer belt, with the protrusions separated to push individual material portions of the material.

5. The pallet lifter of claim 2, wherein the pusher includes a hydraulic arm that pushes individual material portions of the material off of the pallet.

6. The pallet lifter of claim 1, wherein the pusher is configured to push the materials from a bottom of a material stack on a pallet engaged by the fork.

7. The pallet lifter of claim 1, wherein the material retainer and the pusher are movable together toward and away from the fork.

8. The pallet lifter of claim 7, wherein the material retainer and the pusher are parts of an unloader that are movable together.

9. The pallet lifter of claim 8, further comprising a positioner that moves the unloader relative to the frame.

10. The pallet lifter of claim 9, wherein the positioner includes a hydraulic cylinder that is mechanically coupled to the unloader.

11. The pallet lifter of claim 1, wherein the material retainer is a guide that engages material portions of the material at a top of the material.

12. The pallet lifter of claim 11, wherein the guide has an adjustable width.

13. The pallet lifter of claim 1, wherein the material retainer is a cage.

14. The pallet lifter of claim 13,
wherein the cage includes a pair of side pieces, and a front piece;
wherein the front piece is selectively separable from the sides; and
wherein the front piece has a slot therein at a bottom of the front piece.

15. The pallet lifter of claim 13,
wherein the pusher includes a pusher box that is extendable into a space defined by a cage, to push the materials out of the cage; and
wherein the pusher includes a hydraulic actuator that is configured to push the pusher box.

16. The pallet lifter of claim 1, wherein the pusher is pivotally coupled to the frame.

17. The pallet lifter of claim 1, as part of a system that includes the crane, and a control unit of the crane.

18. A method of moving materials that are initially on a pallet, the method comprising:
supporting the pallet and the materials with a pallet lifter;
moving the materials, the pallet, and the pallet lifter using a crane; and
unloading distinct portions of the materials, using a pusher of the pallet lifter;
wherein the unloading includes unloading respective of the portions at different locations, with the crane used to move the pallet lifter to the different locations prior to unloading the respective of the portions; and
wherein the unloading occurs while the pallet lifter is mechanically coupled to the crane.

19. The method of claim 18, wherein the materials include roofing materials, and the distinct portions are individual packages of the roofing materials.

20. The method of claim 19,
wherein the roofing materials including shingles; and
wherein the unloading includes sliding along plastic packaging materials of individual packages of the shingles.

21. The method of claim 18, wherein the moving includes moving the materials, the pallet, and the pallet lifter as a unit, with the materials loaded on the pallet, and with the pallet supported by the pallet lifter.

22. The method of claim 21, wherein the moving includes moving the materials, the pallet, and the pallet lifter, with the pallet lifter secured to the crane through a suspension lug on a frame of pallet lifter.

23. The method of claim 18, wherein the unloading is remotely controlled from the crane.

* * * * *